(12) United States Patent
Igeta et al.

(10) Patent No.: US 12,253,699 B2
(45) Date of Patent: Mar. 18, 2025

(54) LIQUID CRYSTAL OPTICAL ELEMENT

(71) Applicant: Japan Display Inc., Tokyo (JP)

(72) Inventors: Koichi Igeta, Tokyo (JP); Shinichiro Oka, Tokyo (JP); Yasushi Tomioka, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/442,385

(22) Filed: Feb. 15, 2024

(65) Prior Publication Data
US 2024/0184028 A1    Jun. 6, 2024

Related U.S. Application Data

(63) Continuation of application No. PCT/JP2022/025448, filed on Jun. 27, 2022.

(30) Foreign Application Priority Data

Aug. 17, 2021   (JP) ................. 2021-132759

(51) Int. Cl.
*G02B 5/30*    (2006.01)
*G02F 1/1347*    (2006.01)

(52) U.S. Cl.
CPC ....... *G02B 5/3016* (2013.01); *G02F 1/13471* (2013.01)

(58) Field of Classification Search
CPC ............ G02F 1/13471; G02F 2201/44; G09G 2300/023
See application file for complete search history.

(56) References Cited

U.S. PATENT DOCUMENTS

| | | | |
|---|---|---|---|
| 2005/0200776 A1 | 9/2005 | Hara et al. | |
| 2007/0109466 A1* | 5/2007 | Choi | G02F 1/13471 |
| | | | 349/86 |
| 2009/0316091 A1* | 12/2009 | Nose | G09G 3/3629 |
| | | | 349/115 |

(Continued)

FOREIGN PATENT DOCUMENTS

| | | |
|---|---|---|
| JP | 20044763 A | 1/2004 |
| JP | 2004219825 A | 8/2004 |

(Continued)

OTHER PUBLICATIONS

International Search Report mailed on Sep. 20, 2022, in corresponding International Application No. PCT/JP2022/025448, 12 pages (partial English translation provided).

*Primary Examiner* — Jonathan Y Jung
(74) *Attorney, Agent, or Firm* — Maier & Maier, PLLC

(57) ABSTRACT

According to one embodiment, a liquid crystal optical element including a first substrate including a first transparent substrate, a first alignment film, and a first liquid crystal layer which includes first cholesteric liquid crystals, and which reflects part of light incident through the first transparent substrate toward the first transparent substrate, a second substrate including a second transparent substrate, a second alignment film, and a second liquid crystal layer which includes second cholesteric liquid crystals, and which reflects part of light transmitted through the first liquid crystal layer toward the first transparent substrate, and a transparent adhesive layer which adheres the first substrate and the second substrate.

14 Claims, 12 Drawing Sheets

(56) References Cited

U.S. PATENT DOCUMENTS

| | | | |
|---|---|---|---|
| 2010/0177266 A1* | 7/2010 | Kuo | B32B 37/12 |
| | | | 349/187 |
| 2016/0033698 A1 | 2/2016 | Escuti et al. | |
| 2016/0091756 A1 | 3/2016 | Watano et al. | |
| 2018/0314075 A1* | 11/2018 | Zhang | G02F 1/134309 |
| 2019/0094432 A1 | 3/2019 | Yanai et al. | |
| 2020/0073173 A1 | 3/2020 | Ishiguro et al. | |
| 2020/0241344 A1* | 7/2020 | Tan | G02F 1/1326 |
| 2020/0386932 A1* | 12/2020 | Sato | G02B 5/3016 |
| 2021/0033765 A1 | 2/2021 | Sato et al. | |
| 2021/0223581 A1 | 7/2021 | Saitoh et al. | |
| 2021/0267139 A1 | 9/2021 | Kuniyasu et al. | |

FOREIGN PATENT DOCUMENTS

| | | |
|---|---|---|
| JP | 2005308988 A | 11/2005 |
| JP | 201671078 A | 5/2016 |
| JP | 2017522601 A | 8/2017 |
| JP | 2020510228 A | 4/2020 |
| WO | 2017204103 A1 | 11/2017 |
| WO | 2018156784 A1 | 8/2018 |
| WO | 2018212347 A1 | 11/2018 |
| WO | 2019163944 A1 | 8/2019 |
| WO | 2019203357 A1 | 10/2019 |
| WO | 2020075740 A1 | 4/2020 |
| WO | 2020121701 A1 | 6/2020 |

* cited by examiner

LIQUID CRYSTAL OPTICAL ELEMENT

CROSS-REFERENCE TO RELATED APPLICATIONS

This application is a Continuation Application of PCT Application No. PCT/JP2022/025448, filed Jun. 27, 2022 and based upon and claiming the benefit of priority from Japanese Patent Application No. 2021-132759, filed Aug. 17, 2021, the entire contents of all of which are incorporated herein by reference.

FIELD

Embodiments described herein relate generally to a liquid crystal optical element.

BACKGROUND

For example, liquid crystal polarization gratings for which liquid crystal materials are used have been proposed. Such a liquid crystal polarization grating divides incident light into zero-order diffracted light and first-order diffracted light, when light of a wavelength $\lambda$ is incident thereon. In optical elements for which liquid crystal materials are used, it is necessary to adjust parameters such as the refractive anisotropy $\Delta n$ of a liquid crystal layer (difference between the refractive index ne for extraordinary light and the refractive index no for ordinary light of the liquid crystal layer) and the thickness d of the liquid crystal layer, as well as the grating period.

DETAILED DESCRIPTION

Figure 1:
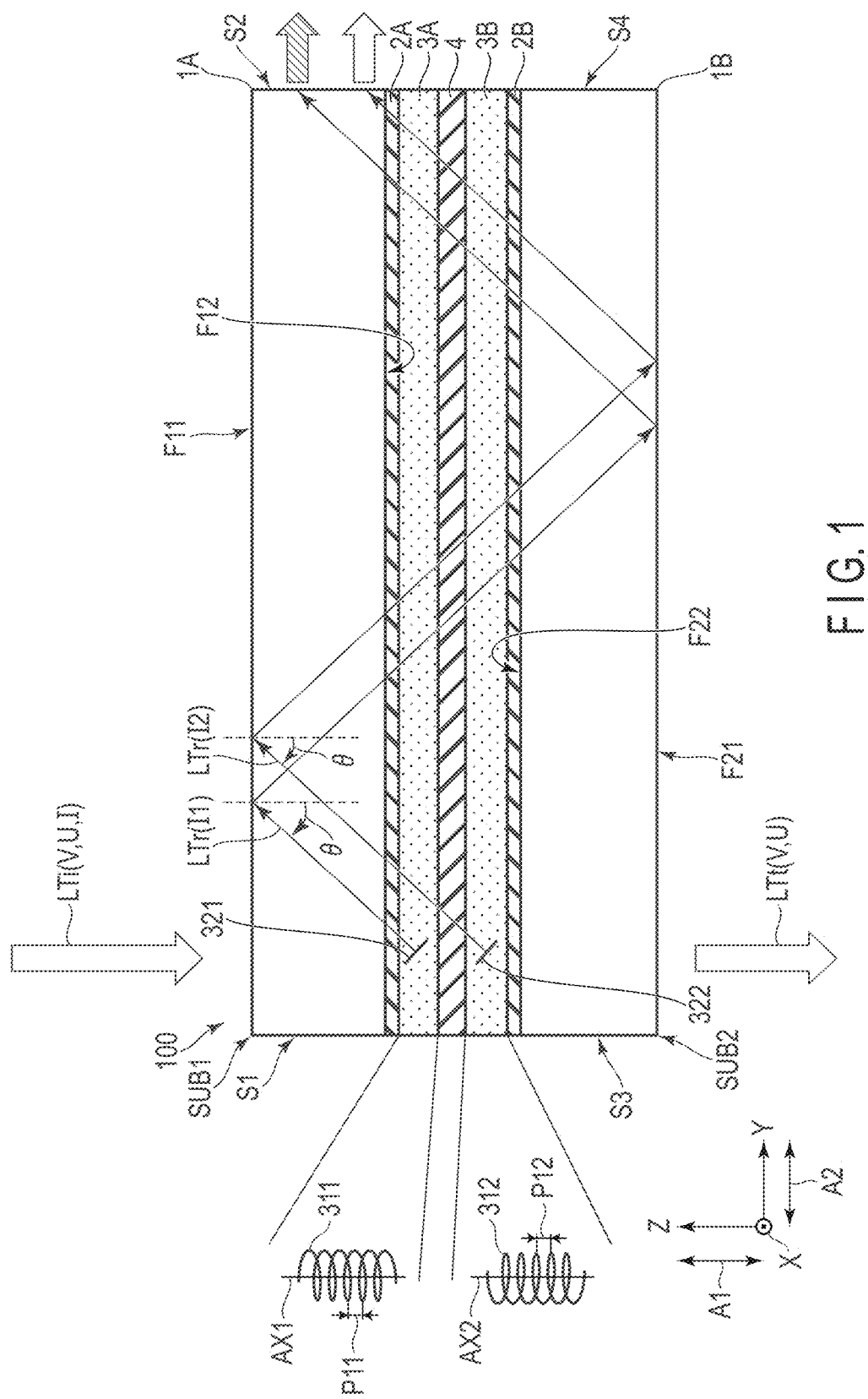
FIG. 1 is a cross-sectional view schematically illustrating a liquid crystal optical element 100 according to Embodiment 1.

Embodiments described herein aim to provide a liquid crystal optical element which can suppress the decrease in the efficiency of light utilization.

In general, according to one embodiment, a liquid crystal optical element comprises a first substrate comprising a first transparent substrate comprising a first outer surface and a first inner surface opposed to the first outer surface, a first alignment film disposed on the first inner surface, and a first liquid crystal layer which overlaps the first alignment film, which comprises first cholesteric liquid crystals, and which reflects part of light incident through the first transparent substrate toward the first transparent substrate, a second substrate comprising a second transparent substrate comprising a second outer surface and a second inner surface opposed to the second outer surface, a second alignment film disposed on the second inner surface, and a second liquid crystal layer which overlaps the second alignment film, which comprises second cholesteric liquid crystals, and which reflects part of light transmitted through the first liquid crystal layer toward the first transparent substrate, and a transparent adhesive layer which adheres the first substrate and the second substrate to each other.

According to the embodiments, a liquid crystal optical element which can suppress the decrease in the efficiency of light utilization can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the drawings, an X-axis, a Y-axis, and a Z-axis orthogonal to each other are described to facilitate understanding as necessary. A direction along the Z-axis is referred to as a Z direction or a first direction A1, a direction along the Y-axis is referred to as a Y direction or a second direction A2, and a direction along the X-axis is referred to as an X direction or a third direction A3. A plane defined by the X-axis and the Y-axis is referred to as an X-Y plane, a plane defined by the X-axis and the Z-axis is referred to as an X-Z plane, and a plane defined by the Y-axis and the Z-axis is referred to as a Y-Z plane.

Embodiment 1

FIG. 1 is a cross-sectional view schematically illustrating a liquid crystal optical element 100 according to Embodiment 1.

The liquid crystal optical element 100 comprises a first substrate SUB1 which comprises a first transparent substrate 1A, a first alignment film 2A, and a first liquid crystal layer 3A, a second substrate SUB2 which comprises a second transparent substrate 1B, a second alignment film 2B, and a second liquid crystal layer 3B, and an adhesive layer 4 which adheres the first substrate SUB1 and the second substrate SUB2 to each other.

The first transparent substrate 1A and the second transparent substrate 1B are composed of a transparent member that transmits light, for example, a transparent glass plate or a transparent synthetic resin plate. The first transparent substrate 1A and the second transparent substrate 1B may be composed of, for example, a transparent synthetic resin plate having flexibility. The first transparent substrate 1A and the second transparent substrate 1B can assume an arbitrary shape. For example, the first transparent substrate 1A and the second transparent substrate 1B may be curved. The refractive indices of the first transparent substrate 1A and the second transparent substrate 1B are greater than, for example, the refractive index of air. The first transparent substrate 1A and the second transparent substrate 1B function as, for example, windowpanes.

In the present specification, "light" includes visible light and invisible light. For example, the wavelength of the lower limit of the visible light range is greater than or equal to 360 nm but less than or equal to 400 nm, and the wavelength of the upper limit of the visible light range is greater than or equal to 760 nm but less than or equal to 830 nm. Visible light includes a first component (blue component) of a first wavelength band (for example, 400 nm to 500 nm), a second component (green component) of a second wavelength band (for example, 500 nm to 600 nm), and a third component (red component) of a third wavelength band (for example, 600 nm to 700 nm). Invisible light includes ultraviolet rays of a wavelength band shorter than the first wavelength band and infrared rays of a wavelength band longer than the third wavelength band.

In the present specification, to be "transparent" should preferably be to be colorless and transparent. Note that to be "transparent" may be to be translucent or to be colored and transparent.

The first transparent substrate 1A is formed in the shape of a flat plate along the X-Y plane and comprises a first outer surface F11, a first inner surface F12, a first side surface S1, and a second side surface S2. The first outer surface F11 and the first inner surface F12 are surfaces substantially parallel to the X-Y plane and are opposed to each other in the first direction A1. The first side surface S1 and the second side surface S2 are surfaces substantially parallel to the X-Z plane and are opposed to each other in the second direction A2.

The second transparent substrate 1B is formed in the shape of a flat plate along the X-Y plane and comprises a second outer surface F21, a second inner surface F22, a third side surface S3, and a fourth side surface S4. The second outer surface F21 and the second inner surface F22 are surfaces substantially parallel to the X-Y plane and are opposed to each other in the first direction A1. The third side surface S3 and the fourth side surface S4 are surfaces substantially parallel to the X-Z plane and are opposed to each other in the second direction A2.

The first transparent substrate 1A and the second transparent substrate 1B are opposed with a distance therebetween in the first direction A1. The first inner surface F12 and the second inner surface F22 are surfaces that face each other. The first outer surface F11 and the second outer surface F21 are surfaces that contact air. The first side surface S1 is located directly above the third side surface S3 in the first direction A1. The second side surface S2 is located directly above the fourth side surface S4 in the first direction A1.

The first alignment film 2A is disposed on the first inner surface F12. The second alignment film 2B is disposed on the second inner surface F22. The first alignment film 2A and the second alignment film 2B are horizontal alignment films having alignment restriction force along the X-Y plane. The first alignment film 2A and the second alignment film 2B are, for example, optical alignment films for which alignment treatment is performed by light irradiation, but may be alignment films for which alignment treatment is performed by rubbing or may be alignment films having minute irregularities.

The first liquid crystal layer 3A overlaps the first alignment film 2A in the first direction A1. That is, the first alignment film 2A is located between the first transparent substrate 1A and the first liquid crystal layer 3A and contacts the first transparent substrate 1A and the first liquid crystal layer 3A.

The second liquid crystal layer 3B overlaps the second alignment film 2B in the first direction A1. That is, the second alignment film 2B is located between the second transparent substrate 1B and the second liquid crystal layer 3B and contacts the second transparent substrate 1B and the second liquid crystal layer 3B.

The first liquid crystal layer 3A reflects part of light LTi incident through the first transparent substrate 1A toward the first transparent substrate 1A. The second liquid crystal layer 3B reflects part of light transmitted through the first liquid crystal layer 3A, of light LTi incident through the first transparent substrate 1A, toward the first transparent substrate 1A.

In Embodiment 1, the first liquid crystal layer 3A comprises a first cholesteric liquid crystal 311 turning in a first turning direction. The first cholesteric liquid crystal 311 has a helical axis AX1 substantially parallel to the first direction A1 and has a helical pitch P11 in the first direction A1.

The second liquid crystal layer 3B comprises a second cholesteric liquid crystal 312 turning in a second turning direction opposite to the first turning direction. The second cholesteric liquid crystal 312 has a helical axis AX2 substantially parallel to the first direction A1 and has a helical pitch P12 in the first direction A1. The helical axis AX1 is parallel to the helical axis AX2. The helical pitch P11 is equal to the helical pitch P12. The helical pitches P11 and P12 each indicate one cycle (360 degrees) of the helix.

The first liquid crystal layer 3A and the second liquid crystal layer 3B reflect circularly polarized light of a selective reflection band determined according to the helical pitch and the refractive anisotropy, of light LTi incident through the first transparent substrate 1A. In the present specification, 'reflection' in each of the liquid crystal layers involves diffraction inside the liquid crystal layers.

In the first liquid crystal layer 3A, the first cholesteric liquid crystal 311 forms a reflective surface 321 which reflects first circularly polarized light corresponding to the first turning direction, of the selective reflection band.

In the second liquid crystal layer 3B, the second cholesteric liquid crystal 312 forms a reflective surface 322 which reflects second circularly polarized light corresponding to the second turning direction, of the selective reflection band. Second circularly polarized light is light circularly polarized in the opposite direction to that of first circularly polarized light.

For example, the first cholesteric liquid crystal 311 and the second cholesteric liquid crystal 312 are both formed to reflect infrared rays I as the selective reflection band, as schematically illustrated in an enlarged manner. That is, the first cholesteric liquid crystal 311 is configured to reflect first circularly polarized light I1 of infrared rays I, and the second cholesteric liquid crystal 312 is configured to reflect second circularly polarized light I2 of infrared rays I. In the present specification, circularly polarized light may be precise circularly polarized light or may be circularly polarized light approximate to elliptically polarized light.

While the example in which infrared rays I are reflected has been described here, the first cholesteric liquid crystal 311 and the second cholesteric liquid crystal 312 may be configured to reflect visible light V or may be configured to reflect ultraviolet rays U.

The relationship between the thicknesses of the thin films constituting the liquid crystal optical element 100 is as follows.

The respective thicknesses of the first alignment film 2A and the second alignment film 2B are 5 nm to 300 nm and should preferably be 10 nm to 200 nm.

The respective thicknesses of the first liquid crystal layer 3A and the second liquid crystal layer 3B are 1 µm to 10 µm and should preferably be 2 µm to 7 µm.

In the example illustrated in FIG. 1, the adhesive layer 4 adheres the first liquid crystal layer 3A and the second liquid crystal layer 3B to each other. The adhesive layer 4 is transparent and has a refractive index equal to those of the first liquid crystal layer 3A and the second liquid crystal layer 3B. The refractive index of the adhesive layer 4 is, for example, 1.3 to 1.9 and should preferably be 1.5 to 1.7.

The adhesive layer 4 may be a photo-curing resin such as an acrylic resin, a thiol-ene resin, an epoxy resin, or a silicone resin, or may be a thermosetting resin such as an epoxy resin or an acrylic resin, or may be various types of adhesive such as a polyvinyl alcohol resin, a polyvinyl acetal resin, or a polyvinyl butyral resin.

The adhesive layer 4 may adhere the first transparent substrate 1A and the second liquid crystal layer 3B to each other or may adhere the second transparent substrate 1B and the first liquid crystal layer 3A to each other, which will be described later as modified examples.

The optical action of the liquid crystal optical element 100 in Embodiment 1 illustrated in FIG. 1 will be described next.

Light LTi incident on the liquid crystal optical element 100 includes, for example, visible light V, ultraviolet rays U, and infrared rays I.

In the example illustrated in FIG. 1, to facilitate understanding, it is assumed that light LTi is incident substantially perpendicularly to the first transparent substrate 1A. The angle of incidence of light LTi to the first transparent substrate 1A is not particularly limited. For example, light LTi may be incident on the first transparent substrate 1A at angles of incidence different from each other.

Light LTi enters the inside of the first transparent substrate 1A from the first outer surface F11, is emitted from the first inner surface F12, is transmitted through the first alignment film 2A, and is incident on the first liquid crystal layer 3A. Then, the first liquid crystal layer 3A reflects first circularly polarized light I1 of infrared rays I of light LTi toward the first transparent substrate 1A, and transmits other light LTt.

Light LTt transmitted through the first liquid crystal layer 3A is transmitted through the adhesive layer 4 and is incident on the second liquid crystal layer 3B. Then, the second liquid crystal layer 3B reflects second circularly polarized light I2 of infrared rays I of light LTt toward the first transparent substrate 1A, and transmits other light LTt. Light LTt transmitted through the second liquid crystal layer 3B includes visible light V and ultraviolet rays U, and is transmitted through the second alignment film 2B and the second transparent substrate 1B.

The first liquid crystal layer 3A reflects first circularly polarized light I1 toward the first transparent substrate 1A at an angle θ of entry which satisfies the optical waveguide conditions in the first transparent substrate 1A. Similarly, the second liquid crystal layer 3B reflects second circularly polarized light I2 toward the first transparent substrate 1A at the angle θ of entry which satisfies the optical waveguide conditions in the first transparent substrate 1A.

The angle θ of entry here corresponds to an angle greater than or equal to the critical angle θc which causes total reflection at the interface between the first transparent substrate 1A and the air. The angle θ of entry represents an angle to a perpendicular line orthogonal to the first transparent substrate 1A.

If the first transparent substrate 1A, the first alignment film 2A, the first liquid crystal layer 3A, the adhesive layer 4, the second liquid crystal layer 3B, the second alignment film 2B, and the second transparent substrate 1B have equivalent refractive indices, the stacked layer body of these can be a single optical waveguide body. In this case, light LTr is guided toward the second side surface S2 and the fourth side surface S4 while being reflected repeatedly at the interface between the first transparent substrate 1A and the air and the interface between the second transparent substrate 1B and the air.

Figure 2:
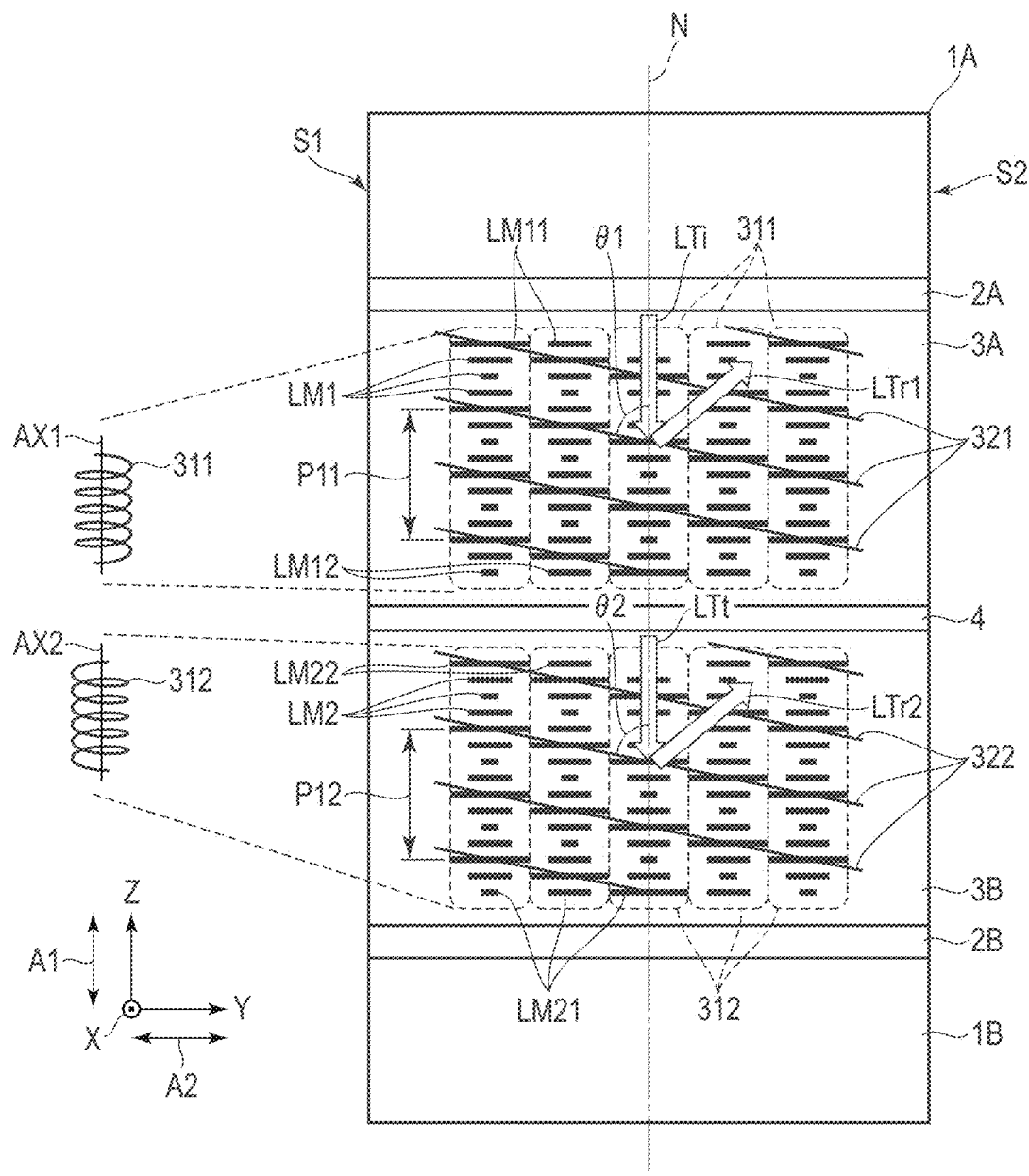
FIG. 2 is a cross-sectional view in a Y-Z plane schematically illustrating the structures of a first liquid crystal layer 3A and a second liquid crystal layer 3B.
Figure 3:
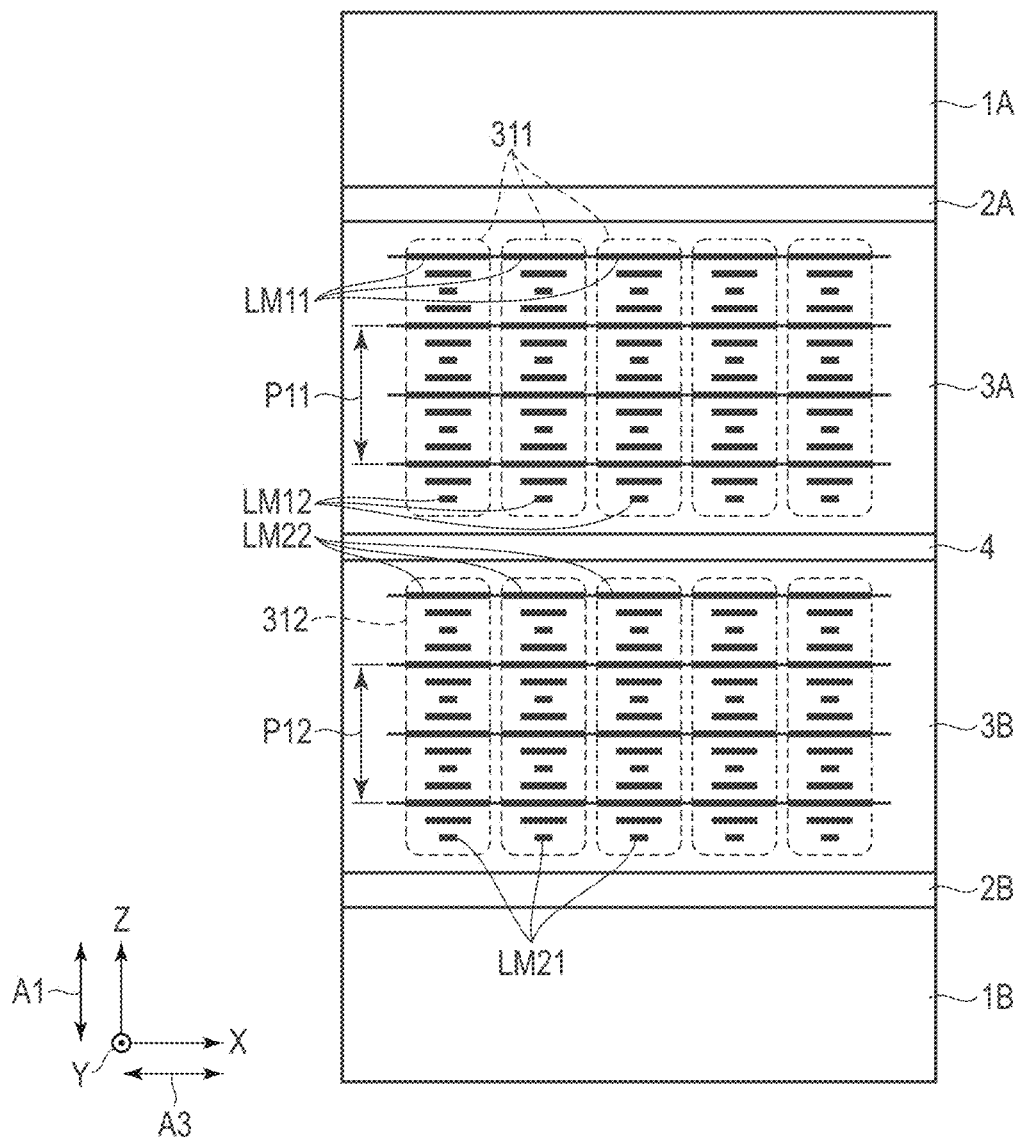
FIG. 3 is a cross-sectional view in a X-Z plane schematically illustrating the structures of the first liquid crystal layer 3A and the second liquid crystal layer 3B.

FIG. 2 is a cross-sectional view in the Y-Z plane schematically illustrating the structures of the first liquid crystal layer 3A and the second liquid crystal layer 3B. FIG. 3 is a cross-sectional view in the X-Z plane schematically illustrating the structures of the first liquid crystal layer 3A and the second liquid crystal layer 3B.

The first liquid crystal layer 3A comprises first cholesteric liquid crystals 311 as helical structures. Each of the first cholesteric liquid crystals 311 has the helical axis AX1 substantially parallel to a normal N of the first transparent substrate 1A. The normal N is parallel to the first direction A1. Each of the first cholesteric liquid crystals 311 has the helical pitch P11 in the first direction A1. In the first liquid crystal layer 3A, the helical pitch P11 is constant with hardly any change in the first direction A1.

Each of the first cholesteric liquid crystals 311 is composed of liquid crystal molecules LM1 stacked helically in the Z direction while turning. Of the liquid crystal molecules LM1, liquid crystal molecules (first liquid crystal molecules) LM11 located on one end side of the first cholesteric liquid crystals 311 are close to the first alignment film 2A. In addition, of the liquid crystal molecules LM1, liquid crystal molecules LM12 located on the other end side of the first cholesteric liquid crystals 311 are close to the adhesive layer 4.

In the first liquid crystal layer 3A, the alignment directions of the first cholesteric liquid crystals 311 adjacent to each other in the second direction A2 are different from each other. The alignment directions of the liquid crystal molecules LM11 change continuously in the second direction A2. In addition, the alignment directions of the liquid crystal molecules LM12 also change continuously in the second direction A2. The alignment directions of liquid crystal molecules in the present specification correspond to the directions of the major axes of the liquid crystal molecules in the X-Y plane.

As illustrated in FIG. 3, in the first liquid crystal layer 3A, the alignment directions of the first cholesteric liquid crystals 311 adjacent in the third direction A3 are identical to each other. That is, the alignment directions of the liquid crystal molecules LM11 are substantially identical. In addition, the alignment directions of the liquid crystal molecules LM12 are also substantially identical.

The first liquid crystal layer 3A comprises reflective surfaces (first reflective surfaces) 321. For example, the reflective surfaces 321 have a substantially planar shape extending in a fixed direction, and are substantially parallel to each other. The reflective surfaces 321 are inclined to cross the normal N at an acute angle on the first side surface S1 side. That is, in the cross-sectional view in the Y-Z plane illustrated in FIG. 2, angles θ1 formed by the reflective surfaces 321 and the normal N are less than 90° on the left side of the normal N (first side surface S1 side).

The reflective surfaces 321 selectively reflect light LTr1, which is part of light LTi incident on the first liquid crystal layer 3A, in accordance with Bragg's law, and transmits other light LTt. The reflective surfaces 321 reflect light LTr1 toward the second side surface S2 side in accordance with the angles θ1.

The reflective surfaces 321 here correspond to the surfaces along which the alignment directions of the liquid crystal molecules LM1 are the same or the surfaces along which spatial phases are the same (equiphase wave surfaces). The shape of the reflective surfaces 321 is not limited to a planar shape, but may be a curved surface such as a concave shape or a convex shape and is not particularly limited. In addition, part of the reflective surfaces 321 may have irregularities, or the angles θ1 formed by the reflective surfaces 321 and the normal N may not be uniform, or the reflective surface 321 may not be arranged regularly. According to the spatial phase distribution of the first cholesteric liquid crystals 311, the reflective surfaces 321 having an arbitrary shape can be formed.

The first liquid crystal layer 3A as described above cures in a state in which the alignment directions of the liquid crystal molecules LM1 are fixed. That is, the alignment directions of the liquid crystal molecules LM1 are not controlled in accordance with an electric field. For this reason, no electrode for forming an electric field in the first liquid crystal layer 3A is provided.

The second liquid crystal layer 3B comprises second cholesteric liquid crystals 312 as helical structures. Each of the second cholesteric liquid crystals 312 has the helical axis AX2 substantially parallel to the normal N. Each of the second cholesteric liquid crystals 312 has the helical pitch P12 in the first direction A1. In the second liquid crystal layer 3B, the helical pitch P12 is constant with hardly any change in the first direction A1.

Each of the second cholesteric liquid crystals 312 is composed of liquid crystal molecules LM2 stacked helically in the Z direction while turning. Note that the turning direction of the second cholesteric liquid crystals 312 is opposite to the turning direction of the first cholesteric liquid crystals 311. Of the liquid crystal molecules LM2, liquid crystal molecules (second liquid crystal molecules) LM21 located on one end side of the second cholesteric liquid crystals 312 are close to the second alignment film 2B. In addition, of the liquid crystal molecules LM2, liquid crystal molecules LM22 located on the other end side of the second cholesteric liquid crystals 312 are close to the adhesive layer 4.

In the second liquid crystal layer 3B, the alignment directions of the second cholesteric liquid crystals 312 adjacent to each other in the second direction A2 are different from each other. The alignment directions of the liquid crystal molecules LM21 change continuously in the second direction A2. In addition, the alignment directions of the liquid crystal molecules LM22 also change continuously in the second direction A2.

As illustrated in FIG. 3, in the second liquid crystal layer 3B, the alignment directions of the second cholesteric liquid crystals 312 adjacent in the third direction A3 are identical to each other. That is, the alignment directions of the liquid crystal molecules LM21 are substantially identical. In addition, the alignment directions of the liquid crystal molecules LM22 are also substantially identical.

The second liquid crystal layer 3B comprises reflective surfaces (second reflective surfaces) 322. For example, the reflective surfaces 322 have a substantially planar shape extending in a fixed direction, and are substantially parallel to each other. The reflective surfaces 322 are inclined to cross the normal N at an acute angle on the first side surface S1 side. That is, in the cross-sectional view in the Y-Z plane illustrated in FIG. 2, angles θ2 formed by the reflective surfaces 322 and the normal N are less than 90° on the left side of the normal N (first side surface S1 side).

The reflective surfaces 322 selectively reflect light LTr2, which is part of light LTt transmitted through the first liquid crystal layer 3A, in accordance with Bragg's law, and transmits other light. The reflective surfaces 322 reflect light LTr2 toward the second side surface S2 side in accordance with the angles θ2.

The reflective surfaces 322 here correspond to the surfaces along which the alignment directions of the liquid crystal molecules LM2 are the same or the surfaces along which spatial phases are the same (equiphase wave surfaces). The shape of the reflective surfaces 322 is not limited to a planar shape, but may be a curved surface such as a concave shape or a convex shape and is not particularly limited. In addition, part of the reflective surfaces 322 may have irregularities, or the angles θ2 formed by the reflective surfaces 322 and the normal N may not be uniform, or the reflective surface 322 may not be arranged regularly. According to the spatial phase distribution of the second cholesteric liquid crystals 312, the reflective surfaces 322 having an arbitrary shape can be formed.

The second liquid crystal layer 3B as described above cures in a state in which the alignment directions of the liquid crystal molecules LM2 are fixed. That is, the alignment directions of the liquid crystal molecules LM2 are not controlled in accordance with an electric field. For this reason, no electrode for forming an electric field in the second liquid crystal layer 3B is provided.

In general, a selective reflection band Δλ of cholesteric liquid crystals for perpendicularly incident light is expressed as "no*P to ne*P", based on the helical pitch P of the cholesteric liquid crystals, the refractive index ne for extraordinary light, and the refractive index no for ordinary light. For this reason, to efficiently reflect circularly polarized light of a specific wavelength λ at a reflective surface, the helical pitch P and the refractive indices ne and no are set such that the specific wavelength λ is included in the selective reflection wavelength band Δλ.

For example, a case where the helical pitch P11 of the first cholesteric liquid crystals 311 and the helical pitch P12 of the second cholesteric liquid crystals 312 are adjusted to set the selective reflection band Δλ to the wavelength band of infrared rays will be described. In order to increase the reflectance at the reflective surfaces 321 of the first liquid crystal layer 3A and the reflective surfaces 322 of the second liquid crystal layer 3B, it is desirable that the thickness in the first direction A1 of the first liquid crystal layer 3A and the thickness in the first direction A1 of the second liquid crystal layer 3B be set to approximately several times to ten times the helical pitch. Assuming that the refractive anisotropy Δn is approximately 0.2, the helical pitch is approximately 500 nm to set the wavelength band of infrared rays as the selective reflection band. In this case, the respective thicknesses of the first liquid crystal layer 3A and the second liquid crystal layer 3B are approximately 1 to 10 μm and should preferably be 2 to 7 μm.

Figure 4:
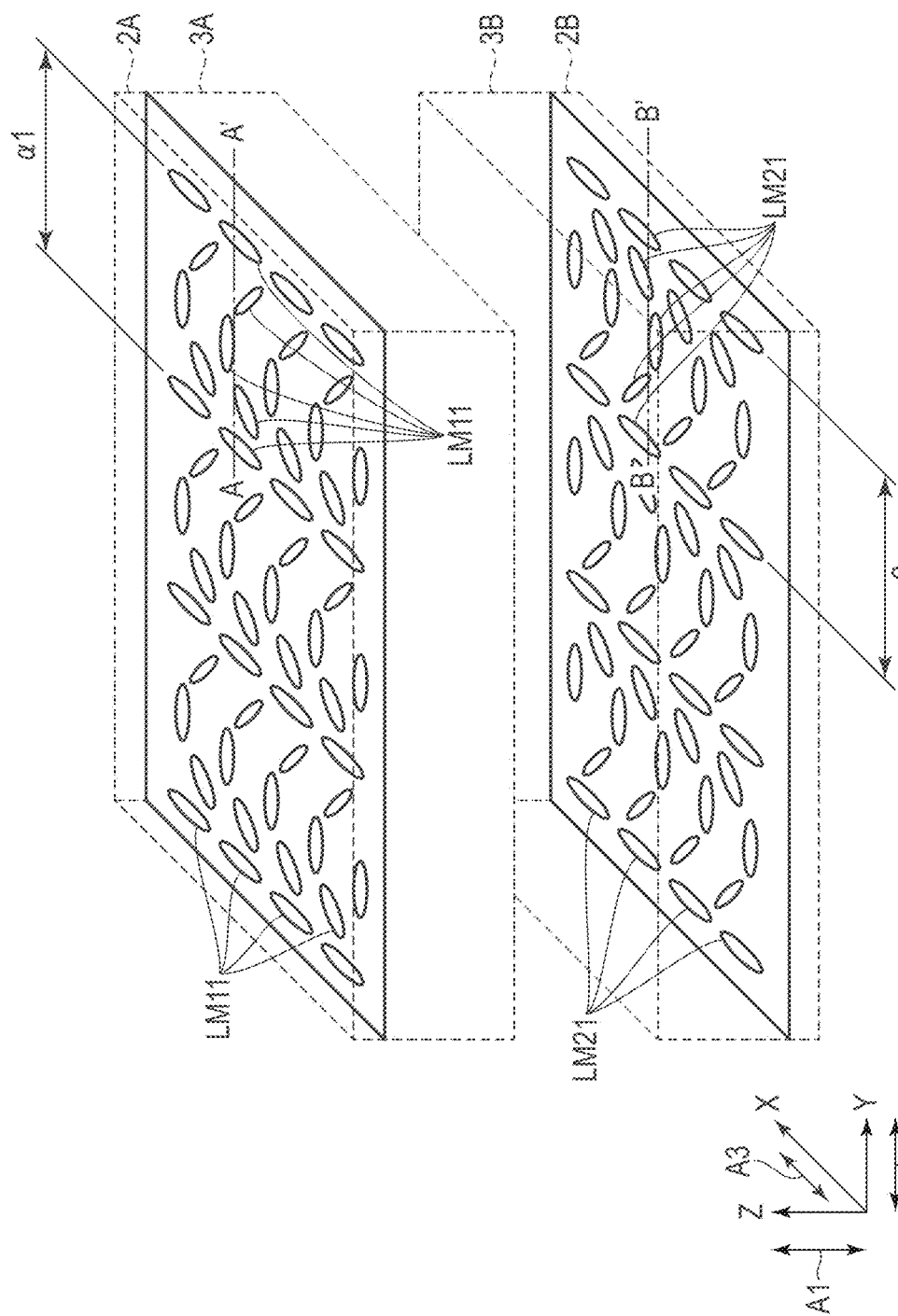
FIG. 4 is a diagram illustrating an example of the alignment patterns of liquid crystal molecules LM1 and LM2 illustrated in FIG. 2.

FIG. 4 is a diagram illustrating an example of the alignment patterns of the liquid crystal molecules LM1 and the liquid crystal molecules LM2 illustrated in FIG. 2.

FIG. 4 illustrates the alignment pattern of the liquid crystal molecules (first liquid crystal molecules) LM11 arrayed along the interface between the first liquid crystal layer 3A and the first alignment film 2A, of the liquid crystal molecules LM1 included in the first liquid crystal layer 3A, and the alignment pattern of the liquid crystal molecules (second liquid crystal molecules) LM21 arrayed along the interface between the second liquid crystal layer 3B and the second alignment film 2B, of the liquid crystal molecules LM2 included in the second liquid crystal layer 3B.

In the first liquid crystal layer 3A, the respective alignment directions of the liquid crystal molecules LM11 arranged in the second direction A2 are different from each other. That is, the spatial phases in the X-Y plane of the first liquid crystal layer 3A are different in the second direction A2. For example, the respective alignment directions of five liquid crystal molecules LM11 arranged along line A-A' change clockwise by equal angles in the Y direction (from the left to the right of the figure). Here, the amount of change of the alignment directions of the liquid crystal molecules LM11 adjacent to each other is constant in the Y direction, but may increase gradually or may decrease gradually.

Here, the distance between two liquid crystal molecules LM11 between which the alignment directions of the liquid crystal molecules LM11 change by 180 degrees in the Y direction is defined as an alignment pitch α1.

On the other hand, in the first liquid crystal layer 3A, the respective alignment directions of the liquid crystal molecules LM11 arranged in the third direction A3 are substantially identical. That is, the spatial phases in the X-Y plane of the first liquid crystal layer 3A are substantially identical in the third direction A3.

In the second liquid crystal layer 3B, the respective alignment directions of the liquid crystal molecules LM21 arranged in the second direction A2 are different from each other. That is, the spatial phases in the X-Y plane of the second liquid crystal layer 3B are different in the second direction A2. For example, the respective alignment directions of five liquid crystal molecules LM21 arranged along line B-B' change counterclockwise by equal angles in the Y direction (from the left to the right of the figure). Here, the amount of change of the alignment directions of the liquid crystal molecules LM21 adjacent to each other is constant in the Y direction, but may increase gradually or may decrease gradually.

Here, the distance between two liquid crystal molecules LM21 between which the alignment directions of the liquid crystal molecules LM21 change by 180 degrees in the Y direction is defined as an alignment pitch α2. For example, the alignment pitches α1 and α2 are less than or equal to 700 nm. The alignment pitch α1 may be equal to the alignment pitch α2, or the alignment pitch α1 may be different from the alignment pitch α2.

On the other hand, in the second liquid crystal layer 3B, the respective alignment directions of the liquid crystal molecules LM21 arranged in the third direction A3 are substantially identical. That is, the spatial phases in the X-Y plane of the second liquid crystal layer 3B are substantially identical in the third direction A3.

Figure 5:
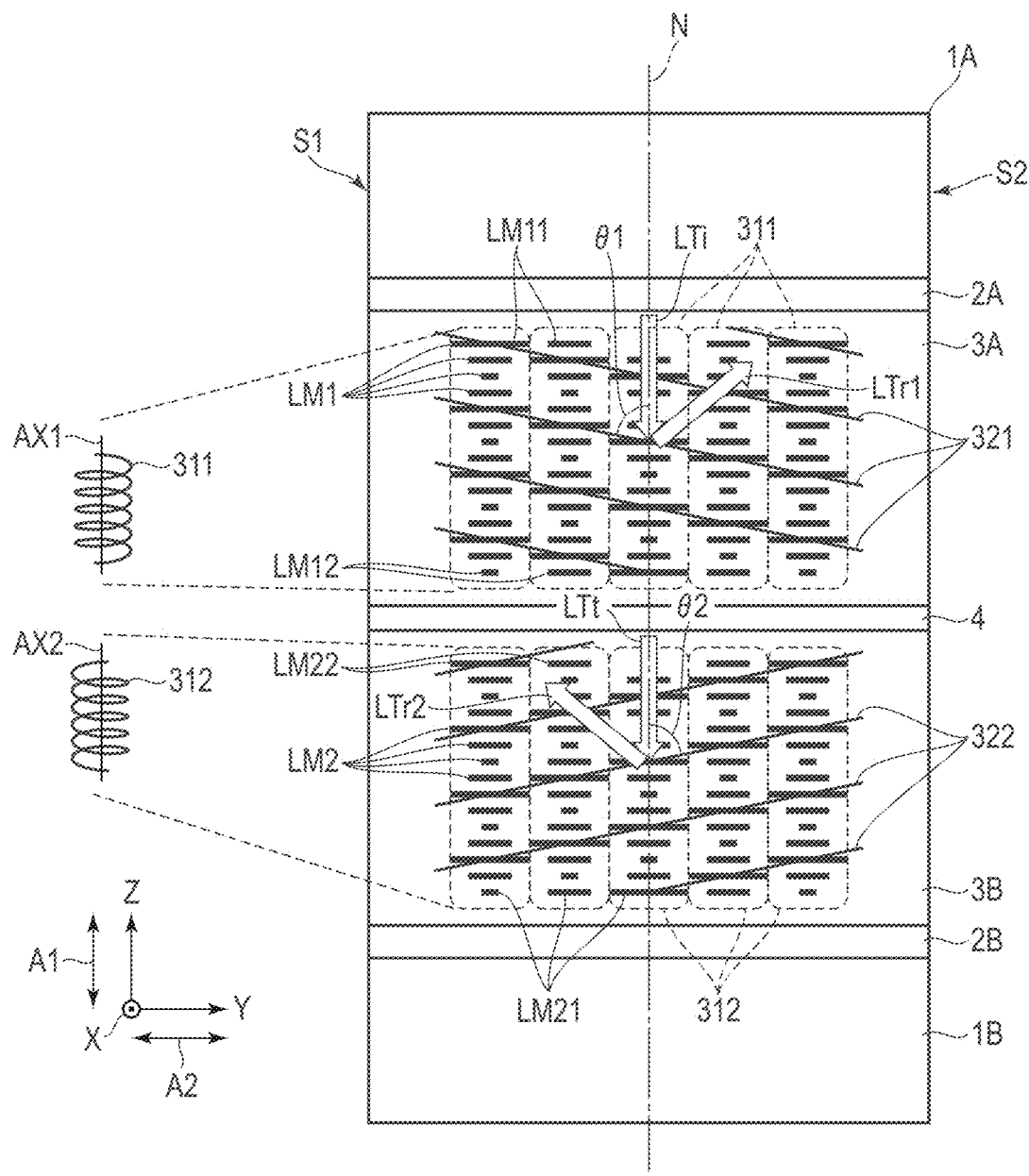
FIG. 5 is a cross-sectional view in the Y-Z plane schematically illustrating other structures of the first liquid crystal layer 3A and the second liquid crystal layer 3B.

FIG. 5 is a cross-sectional view in the Y-Z plane schematically illustrating other structures of the first liquid crystal layer 3A and the second liquid crystal layer 3B.

The example illustrated in FIG. 5 is different from the example illustrated in FIG. 2 in that the inclination directions of the reflective surfaces 322 are different from the inclination directions of the reflective surfaces 321. The cross-sectional structures in the X-Z plane of the first liquid crystal layer 3A and the second liquid crystal layer 3B are as illustrated in FIG. 3.

The first liquid crystal layer 3A comprises the first cholesteric liquid crystals 311. The first cholesteric liquid crystals 311 are composed of the liquid crystal molecules LM1 stacked helically in the Z direction while turning. Of the liquid crystal molecules LM1, the liquid crystal molecules (first liquid crystal molecules) LM11 located on one end side of the first cholesteric liquid crystals 311 are close to the first alignment film 2A, and the liquid crystal molecules LM12 located on the other end side of the first cholesteric liquid crystals 311 are close to the adhesive layer 4.

In the first liquid crystal layer 3A, the reflective surfaces (first reflective surfaces) 321 are inclined to cross the normal N at an acute angle on the first side surface S1 side. That is, in the cross-sectional view in the Y-Z plane illustrated in FIG. 5, the angles θ1 formed by the reflective surfaces 321 and the normal N are less than 90° on the left side of the normal N (first side surface S1 side).

The reflective surfaces 321 selectively reflect light LTr1, which is part of light LTi incident on the first liquid crystal layer 3A, in accordance with Bragg's law, and transmits other light LTt. The reflective surfaces 321 reflect light LTr1 toward the second side surface S2 side in accordance with the angles θ1.

The second liquid crystal layer 3B comprises the second cholesteric liquid crystals 312. The second cholesteric liquid crystals 312 are composed of the liquid crystal molecules LM2 stacked helically in the z direction while turning. Note that the turning direction of the second cholesteric liquid crystals 312 is opposite to the turning direction of the first cholesteric liquid crystals 311. Of the liquid crystal molecules LM2, the liquid crystal molecules (second liquid crystal molecules) LM21 located on one end side of the second cholesteric liquid crystals 312 are close to the second alignment film 2B, and the liquid crystal molecules LM22 located on the other end side of the second cholesteric liquid crystals 312 are close to the adhesive layer 4.

In the second liquid crystal layer 3B, the reflective surfaces (second reflective surfaces) 322 are inclined to cross the normal N at an acute angle on the second side surface S2 side. That is, in the cross-sectional view in the Y-Z plane illustrated in FIG. 5, the angles θ2 formed by the reflective surfaces 322 and the normal N are less than 90° on the right side of the normal N (second side surface S2 side).

The reflective surfaces 322 selectively reflect light LTr2, which is part of light LTt transmitted through the first liquid crystal layer 3A, in accordance with Bragg's law, and transmits other light. The reflective surfaces 322 reflect light LTr2 toward the first side surface S1 side in accordance with the angles θ2.

Figure 6:
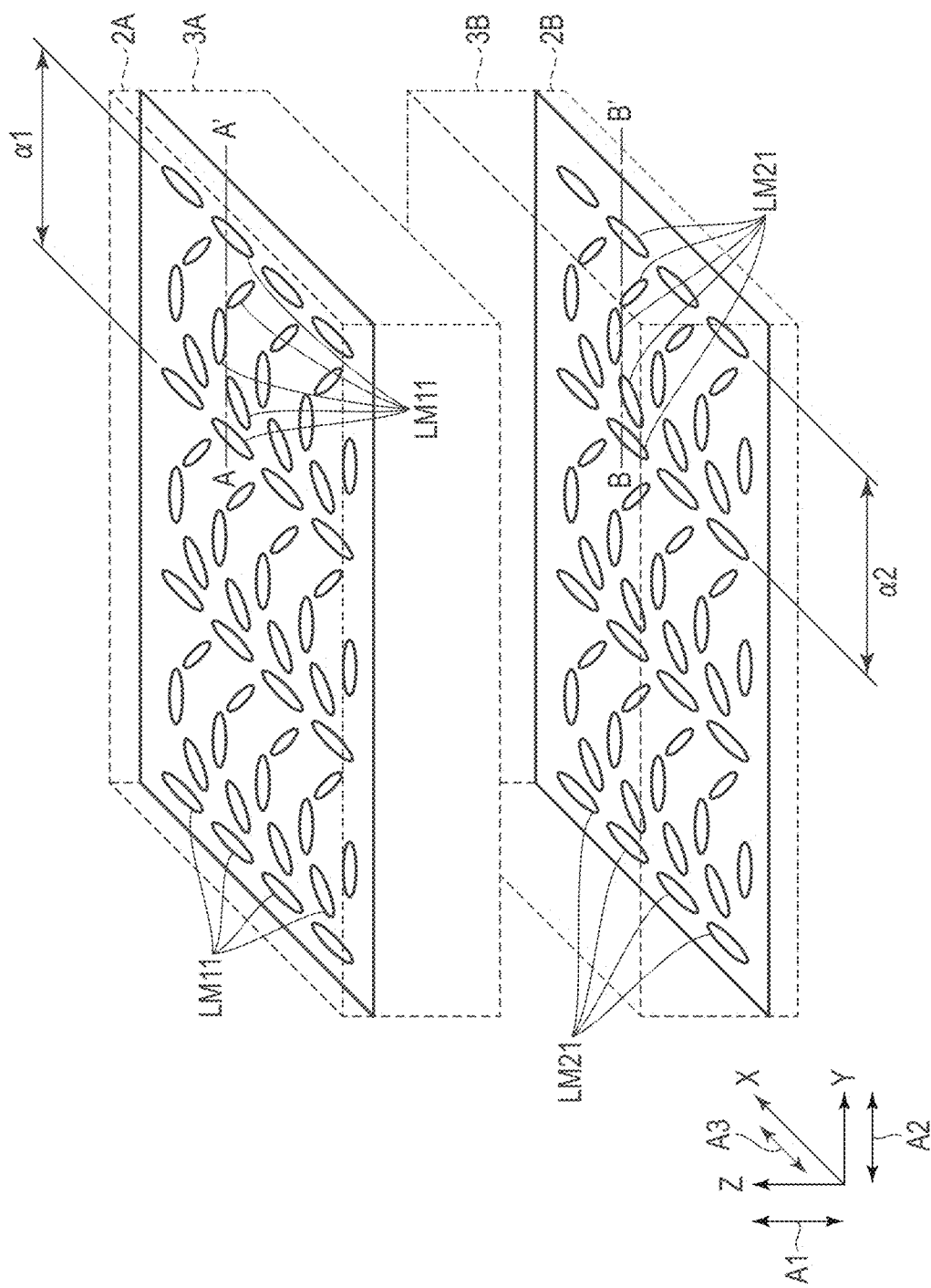
FIG. 6 is a diagram illustrating an example of the alignment patterns of the liquid crystal molecules LM1 and LM2 illustrated in FIG. 5.

FIG. 6 is a diagram illustrating an example of the alignment patterns of the liquid crystal molecules LM1 and the liquid crystal molecules LM2 illustrated in FIG. 5.

FIG. 6 illustrates the alignment pattern of the liquid crystal molecules (first liquid crystal molecules) LM11 arrayed along the interface between the first liquid crystal layer 3A and the first alignment film 2A, of the liquid crystal molecules LM1 included in the first liquid crystal layer 3A, and the alignment pattern of the liquid crystal molecules (second liquid crystal molecules) LM21 arrayed along the interface between the second liquid crystal layer 3B and the second alignment film 2B, of the liquid crystal molecules LM2 included in the second liquid crystal layer 3B.

In the first liquid crystal layer 3A, the respective alignment directions of the liquid crystal molecules LM11 arranged in the second direction A2 are different from each other. That is, the spatial phases in the X-Y plane of the first liquid crystal layer 3A are different in the second direction A2. For example, the respective alignment directions of five liquid crystal molecules LM11 arranged along line A-A' change clockwise by equal angles in the Y direction (from the left to the right of the figure). Here, the amount of change of the alignment directions of the liquid crystal molecules LM11 adjacent to each other is constant in the Y direction, but may increase gradually or may decrease gradually.

In the second liquid crystal layer 3B, the respective alignment directions of the liquid crystal molecules LM21 arranged in the second direction A2 are different from each other. That is, the spatial phases in the X-Y plane of the second liquid crystal layer 3B are different in the second direction A2. For example, the respective alignment directions of five liquid crystal molecules LM21 arranged along line B-B' change clockwise by equal angles in the Y direction (from the left to the right of the figure). Here, the amount of change of the alignment directions of the liquid crystal molecules LM21 adjacent to each other is constant in the Y direction, but may increase gradually or may decrease gradually.

For example, the alignment pitches α1 and α2 are less than or equal to 700 nm, and the alignment pitch α1 may be equal to the alignment pitch α2 or the alignment pitch α1 may be different from the alignment pitch α2.

In the first liquid crystal layer 3A, the respective alignment directions of the liquid crystal molecules LM11 arranged in the third direction A3 are substantially identical. In addition, in the second liquid crystal layer 3B, the respective alignment directions of the liquid crystal molecules LM21 arranged in the third direction A3 are substantially identical.

Figure 7:
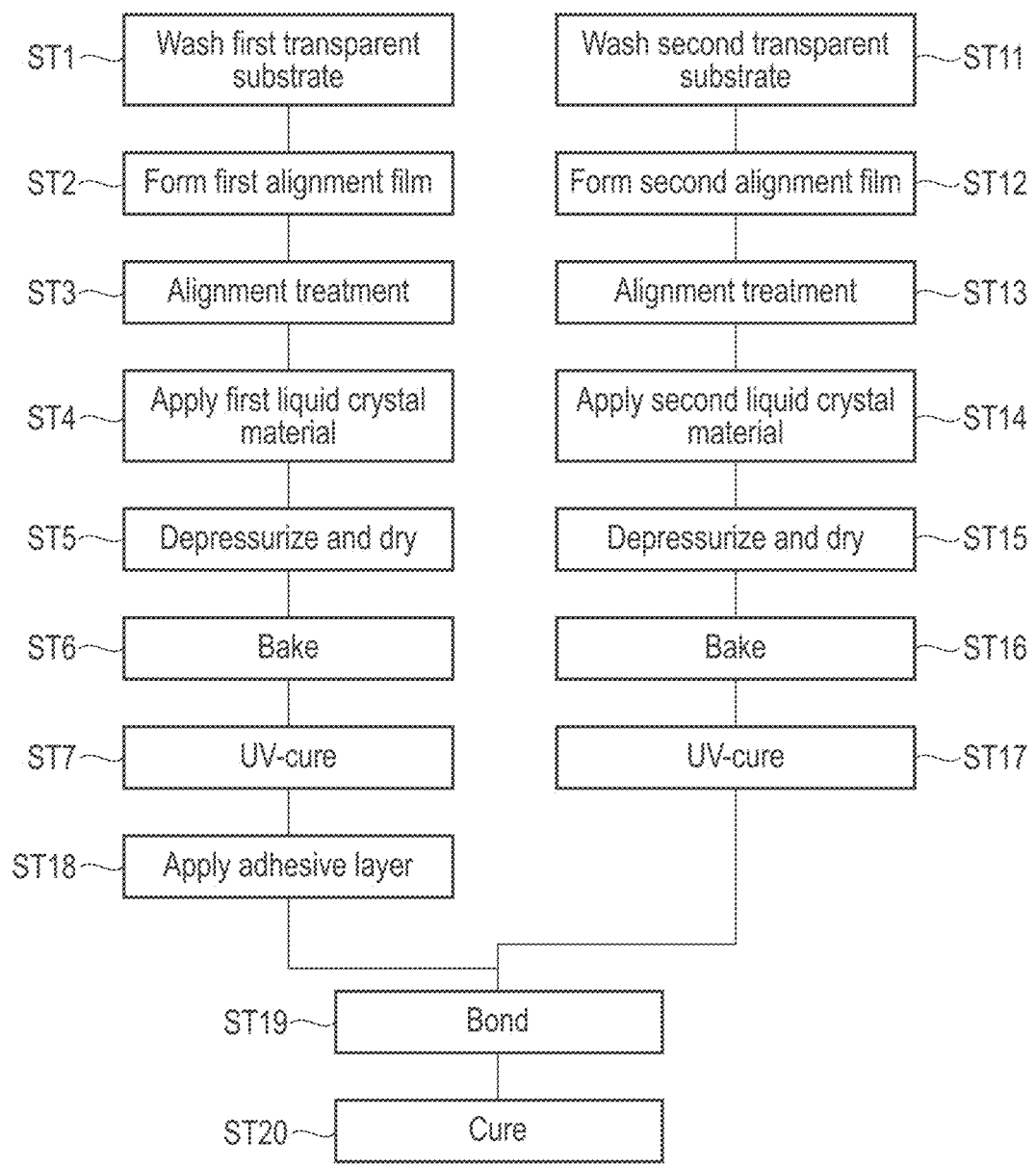
FIG. 7 is a diagram for explaining a method for manufacturing the liquid crystal optical element 100.

An example of a method for manufacturing the liquid crystal optical element 100 will be described next with reference to FIG. 7.

The manufacturing process of the first substrate SUB1, in which the first alignment film 2A and the first liquid crystal layer 3A are formed on the first transparent substrate 1A, and the manufacturing process of the second substrate SUB2, in which the second alignment film 2B and the second liquid crystal layer 3B are formed on the second transparent substrate 1B, can be performed in parallel.

The manufacturing process of the first substrate SUB1 is as follows.

First, the first transparent substrate 1A is washed (step ST1).

Then, the first alignment film 2A is formed on the first inner surface F12 of the first transparent substrate 1A (step ST2). After that, the alignment treatment of the first alignment film 2A is performed (step ST3).

Then, a first liquid crystal material (monomeric material for forming the first cholesteric liquid crystals) is applied to the top of the first alignment film 2A (step ST4). Liquid crystal molecules included in the first liquid crystal material are aligned in a predetermined direction in accordance with the direction of the alignment treatment of the first alignment film 2A. After that, the first liquid crystal material is dried by depressurizing the inside of a chamber (step ST5), and the first liquid crystal material is further baked (step ST6). Then, the first liquid crystal material is irradiated with ultraviolet rays and is cured (step ST7). In this way, the first liquid crystal layer 3A comprising the first cholesteric liquid crystals 311 is formed.

The manufacturing process of the second substrate SUB2 is as follows.

First, the second transparent substrate 1B is washed (step ST11).

Then, the second alignment film 2B is formed on the second inner surface F22 of the second transparent substrate 1B (step ST12). After that, the alignment treatment of the second alignment film 2B is performed (step ST13).

Then, a second liquid crystal material (monomeric material for forming the second cholesteric liquid crystals) is applied to the top of the second alignment film 2B (step ST14). Liquid crystal molecules included in the second liquid crystal material are aligned in a predetermined direction in accordance with the direction of the alignment treatment of the second alignment film 2B. After that, the second liquid crystal material is dried by depressurizing the inside of a chamber (step ST15), and the second liquid crystal material is further baked (step ST16). Then, the second liquid crystal material is irradiated with ultraviolet rays and is cured (step ST7). In this way, the second liquid crystal layer 3B comprising the second cholesteric liquid crystals 312 is formed.

The process of adhering the first substrate SUB1 and the second substrate SUB2 to each other is as follows.

First, the adhesive layer 4 is applied to the surface of the cured first liquid crystal layer 3A or the surface of the cured second liquid crystal layer 3B (step ST18). Then, the first liquid crystal layer 3A and the second liquid crystal layer 3B are bonded together with the adhesive layer 4 interposed therebetween (step ST19). After that, the adhesive layer 4 is irradiated with light such as ultraviolet rays or heated, and the adhesive layer 4 is cured (step ST20).

While the case where the first liquid crystal layer 3A and the second liquid crystal layer 3B are adhered to each other has been described here, the first transparent substrate 1A and the second liquid crystal layer 3B may be adhered to each other by the adhesive layer 4, or the second transparent substrate 1B and the first liquid crystal layer 3A may be adhered to each other by the adhesive layer 4.

Through the above-described processes, the liquid crystal optical element 100 illustrated in FIG. 1 is manufactured.

According to Embodiment 1 as described above, the first liquid crystal layer 3A comprising the first cholesteric liquid crystals 311 can be formed with the first transparent substrate 1A as a base, and the second liquid crystal layer 3B comprising the second cholesteric liquid crystals 312 can be formed with the second transparent substrate 1B as a base. In addition, the steps of applying another alignment film and applying another liquid crystal layer to the surface of the first liquid crystal layer 3A or the surface of the second liquid crystal layer 3B are unnecessary.

This suppresses disorder in alignment of the liquid crystal molecules LM1 included in the first cholesteric liquid crystals 311 and the liquid crystal molecules LM2 included in the second cholesteric liquid crystals 312, and suppresses undesirable scattering in the first liquid crystal layer 3A (or cloudiness of the first liquid crystal layer 3A) and undesirable scattering in the second liquid crystal layer 3B (or cloudiness of the second liquid crystal layer 3B). Accordingly, the decrease in the efficiency of light utilization in the liquid crystal optical element 100 can be suppressed.

In addition, the respective selective reflection bands Δλ of the first liquid crystal layer 3A and the second liquid crystal layer 3B hardly change before and after the first liquid crystal layer 3A and the second liquid crystal layer 3B are bonded together. Thus, desired reflective performance can be achieved.

In addition, according to Embodiment 1, the first cholesteric liquid crystals 311 and the second cholesteric liquid crystals 312 have an equal helical pitch and turn in directions opposite to each other. Thus, in the liquid crystal optical element 100, not only first circularly polarized light but also second circularly polarized light of the same selective reflection band (in the above example, infrared rays) can be guided, and the efficiency of light utilization can be further improved.

Embodiment 2

Figure 8:
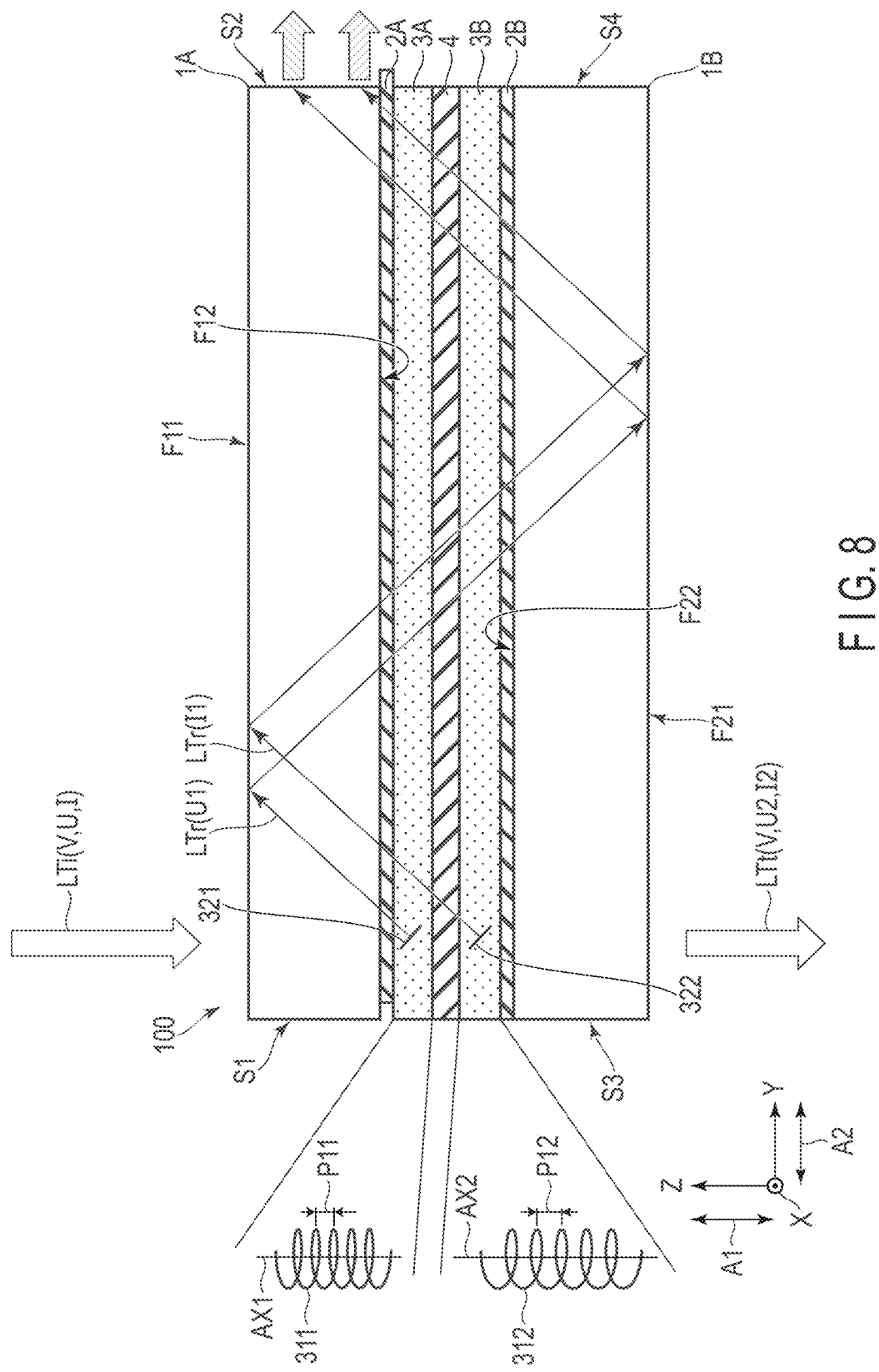
FIG. 8 is a cross-sectional view schematically illustrating a liquid crystal optical element 100 according to Embodiment 2.

FIG. 8 is a cross-sectional view schematically illustrating a liquid crystal optical element 100 according to Embodiment 2.

Embodiment 2 illustrated in FIG. 8 is different from Embodiment 1 illustrated in FIG. 1 in that a helical pitch P11 of a first cholesteric liquid crystal 311 is different from a helical pitch P12 of a second cholesteric liquid crystal 312. The cross-sectional structure of the liquid crystal optical element 100 of Embodiment 2 is the same as that of Embodiment 1. That is, the liquid crystal optical element 100 is formed as the stacked layer body of a first transparent substrate 1A, a first alignment film 2A, a first liquid crystal layer 3A, an adhesive layer 4, a second liquid crystal layer 3B, a second alignment film 2B, and a second transparent substrate 1B.

In the example illustrated in the figure, the helical pitch P11 is smaller than the helical pitch P12. Note that the helical pitch P12 may be smaller than the helical pitch P11. The turning direction of the first cholesteric liquid crystal 311 is identical to the turning direction of the second cholesteric liquid crystal 312.

In the first liquid crystal layer 3A, the first cholesteric liquid crystal 311 forms a reflective surface 321 which reflects first circularly polarized light of a selective reflection band.

In the second liquid crystal layer 3B, the second cholesteric liquid crystal 312 forms a reflective surface 322 which reflects first circularly polarized light of a selective reflection band which is different from that of the first liquid crystal layer 3A.

For example, the first cholesteric liquid crystal 311 is formed to reflect ultraviolet rays U as the selective reflection band. That is, the first cholesteric liquid crystal 311 is configured to reflect first circularly polarized light U1 of ultraviolet rays U.

In addition, the second cholesteric liquid crystal 312 is formed to reflect infrared rays I as the selective reflection band. That is, the second cholesteric liquid crystal 312 is configured to reflect first circularly polarized light I1 of infrared rays I.

While the example in which ultraviolet rays U and infrared rays I are reflected has been described here, the first cholesteric liquid crystal 311 and the second cholesteric liquid crystal 312 may be configured to reflect visible light V.

The optical action of the liquid crystal optical element 100 in Embodiment 2 illustrated in FIG. 8 will be described next.

Light LTi incident on the liquid crystal optical element 100 includes, for example, visible light V, ultraviolet rays U, and infrared rays I.

Light LTi enters the inside of the first transparent substrate 1A from a first outer surface F11, is emitted from a first inner surface F12, is transmitted through the first alignment film 2A, and is incident on the first liquid crystal layer 3A. Then, the first liquid crystal layer 3A reflects first circularly polarized light U1 of ultraviolet rays U of light LTi toward the first transparent substrate 1A, and transmits other light LTt.

Light LTt transmitted through the first liquid crystal layer 3A is transmitted through the adhesive layer 4 and is incident on the second liquid crystal layer 3B. Then, the second liquid crystal layer 3B reflects first circularly polarized light I1 of infrared rays I of light LTt toward the first transparent substrate 1A, and transmits other light LTt. Light LTt transmitted through the second liquid crystal layer 3B includes visible light V, second circularly polarized light U2 of ultraviolet rays U, and second circularly polarized light I2 of infrared rays I.

If the first transparent substrate 1A, the first alignment film 2A, the first liquid crystal layer 3A, the adhesive layer 4, the second liquid crystal layer 3B, the second alignment film 2B, and the second transparent substrate 1B have equivalent refractive indices, the stacked layer body of these can be a single optical waveguide body. In this case, light LTr is guided toward a second side surface S2 and a fourth side surface S4 while being reflected repeatedly at the interface between the first transparent substrate 1A and the air and the interface between the second transparent substrate 1B and the air.

In Embodiment 2, too, the same advantages as those of Embodiment 1, described above, are achieved. In addition, the selective reflection band of the liquid crystal optical element 100 can be widened.

Embodiment 3

Figure 9:
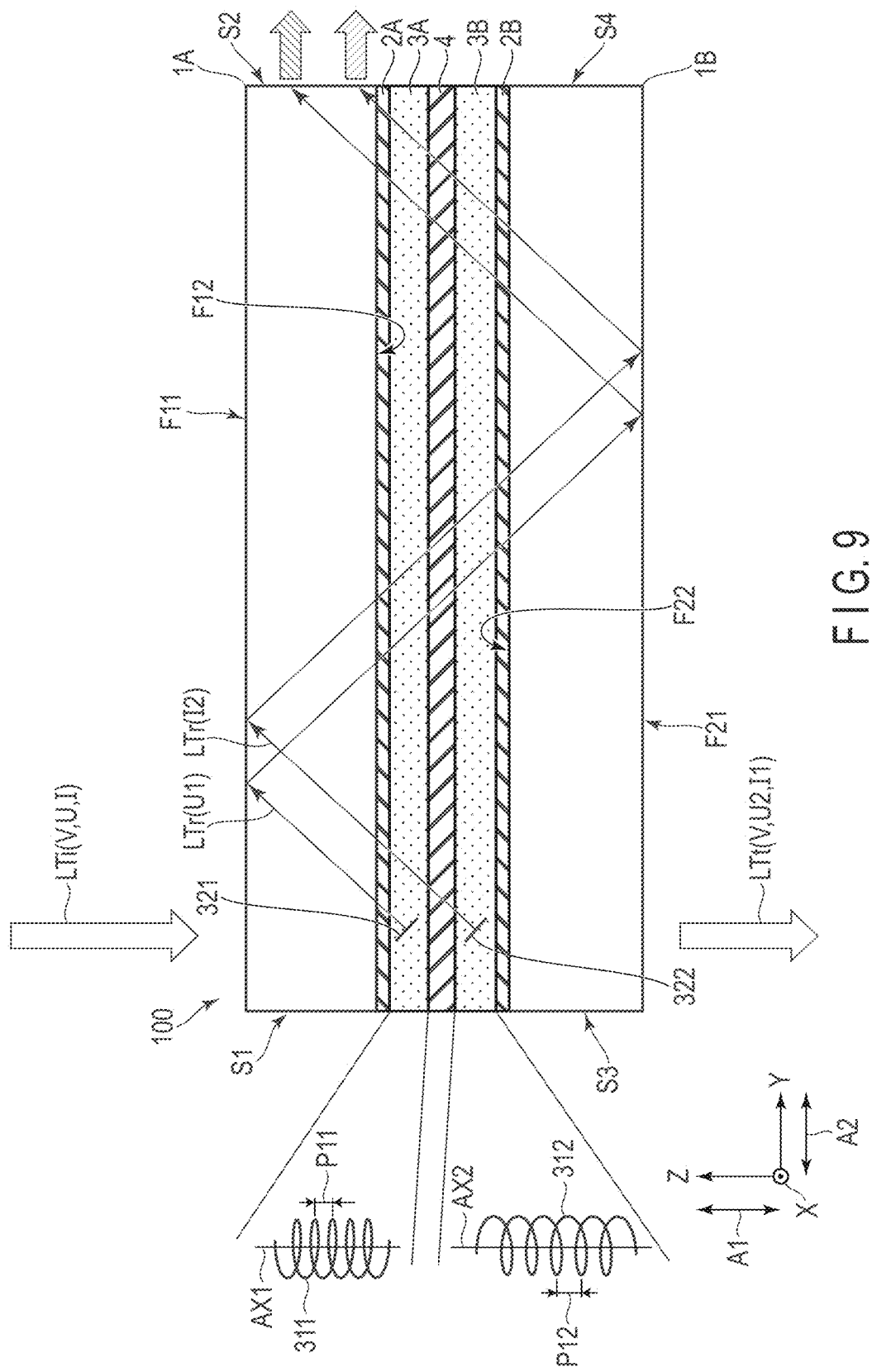
FIG. 9 is a cross-sectional view schematically illustrating a liquid crystal optical element 100 according to Embodiment 3.

FIG. 9 is a cross-sectional view schematically illustrating a liquid crystal optical element 100 according to Embodiment 3.

Embodiment 3 illustrated in FIG. 9 is different from Embodiment 2 illustrated in FIG. 8 in that the turning direction of a first cholesteric liquid crystal 311 is opposite to the turning direction of a second cholesteric liquid crystal 312. In the example illustrated in the figure, a helical pitch P11 is smaller than a helical pitch P12. Note that the helical pitch P12 may be smaller than the helical pitch P11.

In a first liquid crystal layer 3A, the first cholesteric liquid crystal 311 forms a reflective surface 321 which reflects first circularly polarized light of a selective reflection band.

In a second liquid crystal layer 3B, the second cholesteric liquid crystal 312 forms a reflective surface 322 which reflects second circularly polarized light of a selective reflection band which is different from that of the first liquid crystal layer 3A.

For example, the first cholesteric liquid crystal 311 is formed to reflect ultraviolet rays U as the selective reflection band. That is, the first cholesteric liquid crystal 311 is configured to reflect first circularly polarized light U1 of ultraviolet rays U.

In addition, the second cholesteric liquid crystal 312 is formed to reflect infrared rays I as the selective reflection band. That is, the second cholesteric liquid crystal 312 is configured to reflect second circularly polarized light I2 of infrared rays I.

In Embodiment 3, too, the same advantages as those of Embodiment 2, described above, are achieved.

A photovoltaic cell device 200 will be described next as an application example of the liquid crystal optical elements 100 according to the present embodiments.

Figure 10:
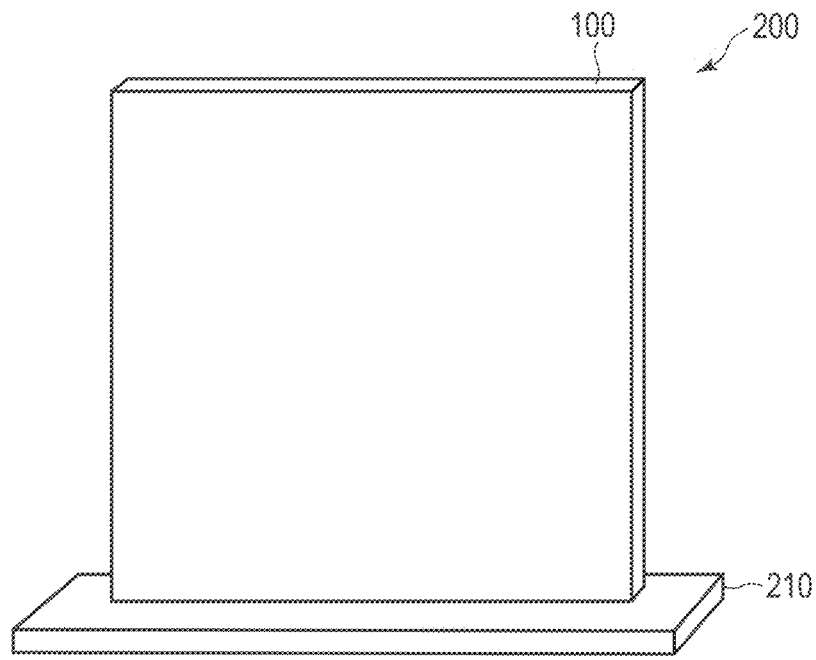
FIG. 10 is a diagram illustrating an example of the outside of a photovoltaic cell device 200.

FIG. 10 is a diagram illustrating an example of the outside of the photovoltaic cell device 200.

The photovoltaic cell device 200 comprises any one of the above-described liquid crystal optical elements 100 and a power generation device 210. The power generation device 210 is provided along one side of the liquid crystal optical element 100. The one side of the liquid crystal optical element 100, which is opposed to the power generation device 210, is a side along the second side surface S2 of the first transparent substrate 1A and the fourth side surface S4 of the second transparent substrate 1B illustrated in FIG. 1 or the like. In the photovoltaic cell device 200, the liquid crystal optical element 100 functions as a lightguide element which guides light of a predetermined wavelength to the power generation device 210.

The power generation device 210 comprises a plurality of photovoltaic cells. The photovoltaic cells receive light and convert the energy of received light into power. That is, the photovoltaic cells generate power from received light. The types of photovoltaic cell are not particularly limited. For example, the photovoltaic cells are silicon photovoltaic cells, compound photovoltaic cells, organic photovoltaic cells, perovskite photovoltaic cells, or quantum dot photovoltaic cells. The silicon photovoltaic cells include photovoltaic cells comprising amorphous silicon, photovoltaic cells comprising polycrystalline silicon, etc.

Figure 11:
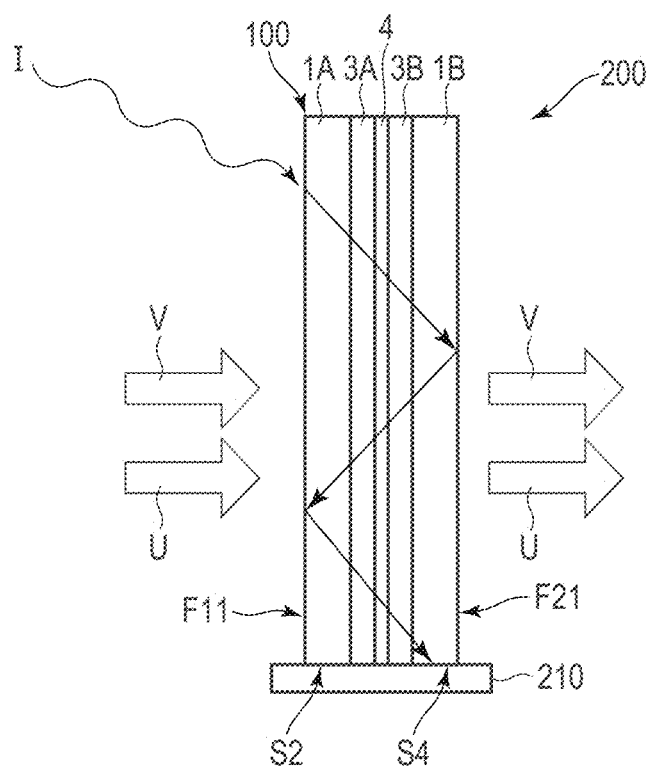
FIG. 11 is a diagram for explaining the operation of the photovoltaic cell device 200.

FIG. 11 is a diagram for explaining the operation of the photovoltaic cell device 200.

The first outer surface F11 of the first transparent substrate 1A faces outdoors. In addition, the second outer surface F21 of the second transparent substrate 1B faces, for example, indoors. In FIG. 11, the illustration of the first alignment film and the second alignment film is omitted.

The first liquid crystal layer 3A and the second liquid crystal layer 3B are, for example, configured to reflect first circularly polarized light I1 and second circularly polarized light I2 of infrared rays I as illustrated in FIG. 1. The first liquid crystal layer 3A and the second liquid crystal layer 3B may be configured to reflect first circularly polarized light U1 of ultraviolet rays U and first circularly polarized light I1 of infrared rays I, respectively, as illustrated in FIG. 8, or may be configured to reflect first circularly polarized light U1 of ultraviolet rays U and second circularly polarized light I2 of infrared rays I, respectively, as illustrated in FIG. 9.

Infrared rays I reflected by the first liquid crystal layer 3A and the second liquid crystal layer 3B propagate through the liquid crystal optical element 100 toward the second side surface S2 and the fourth side surface S4. The power generation device 210 receives infrared rays I transmitted through the second side surface S2 and the fourth side surface S4 and generates power.

Visible light V and ultraviolet rays U of solar light are transmitted through the liquid crystal optical element 100. In particular, a first component (blue component), a second component (green component), and a third component (red component), which are main components of visible light V, are transmitted through the liquid crystal optical element 100. Thus, the coloration of light transmitted through the photovoltaic cell device 200 can be suppressed. In addition, the decrease in the transmittance of visible light V in the photovoltaic cell device 200 can be suppressed.

Modified Example 1

Figure 12:
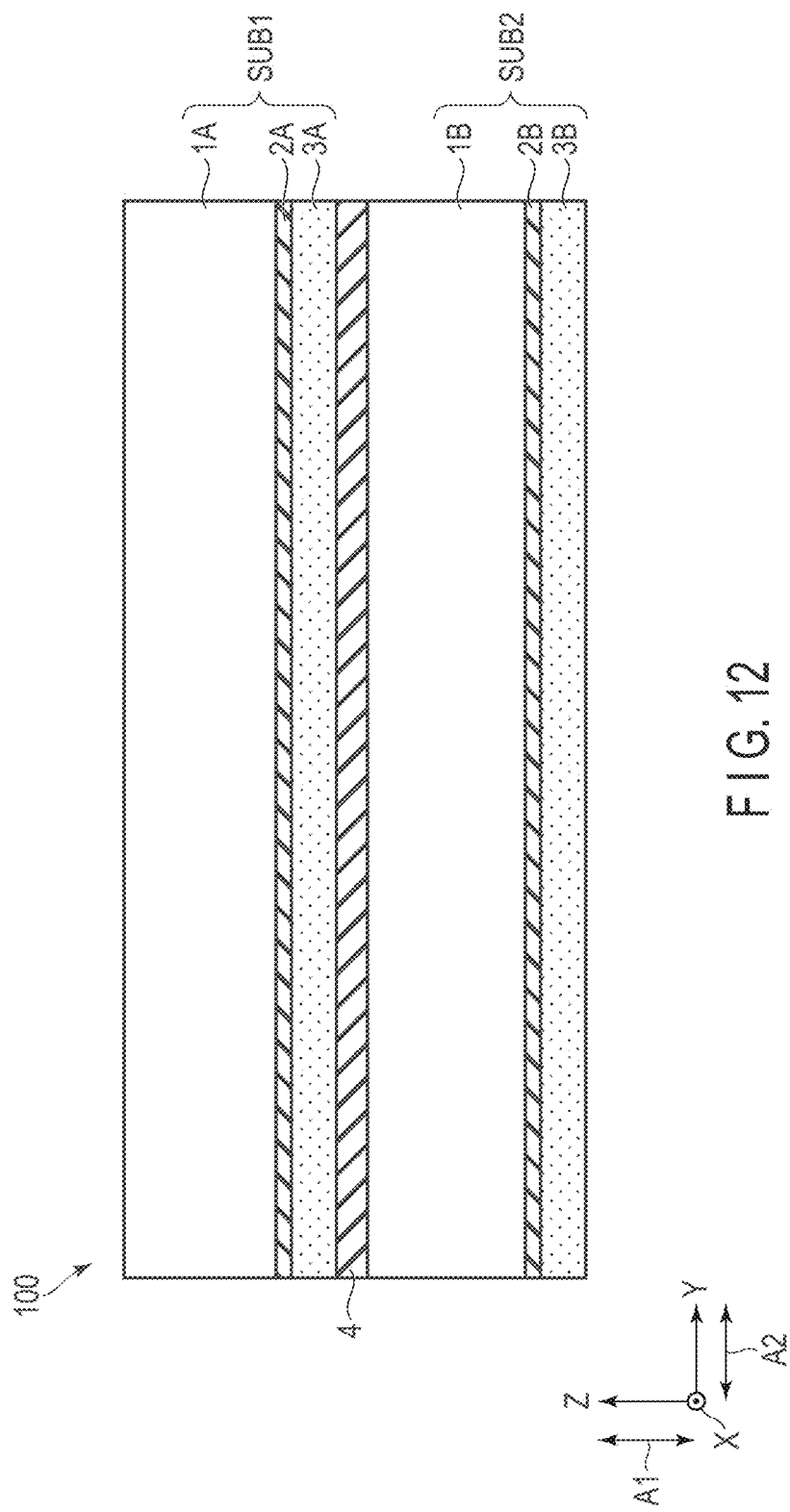
FIG. 12 is a cross-sectional view schematically illustrating Modified Example 1 of the liquid crystal optical elements 100.

FIG. 12 is a cross-sectional view schematically illustrating Modified Example 1 of the liquid crystal optical elements 100.

In Modified Example 1, the first liquid crystal layer 3A and the second transparent substrate 1B are adhered to each other by the adhesive layer 4. That is, the adhesive layer 4, the second transparent substrate 1B, and the second alignment film 2B are interposed between the first liquid crystal layer 3A and the second liquid crystal layer 3B.

The first liquid crystal layer 3A and the second liquid crystal layer 3B can be configured as in any one of Embodiments 1 to 3, described above, the detailed description of which is omitted.

For example, in the case of Embodiment 1, the turning direction of the first cholesteric liquid crystal 311 of the first liquid crystal layer 3A is opposite to the turning direction of the second cholesteric liquid crystal 312 of the second liquid crystal layer 3B, and the helical pitch P11 of the first cholesteric liquid crystal 311 is equal to the helical pitch P12 of the second cholesteric liquid crystal 312.

In addition, in the case of Embodiment 2, the turning direction of the first cholesteric liquid crystal 311 of the first liquid crystal layer 3A is identical to the turning direction of the second cholesteric liquid crystal 312 of the second liquid crystal layer 3B, and the helical pitch P11 of the first cholesteric liquid crystal 311 is different from the helical pitch P12 of the second cholesteric liquid crystal 312.

Moreover, in the case of Embodiment 3, the turning direction of the first cholesteric liquid crystal 311 of the first liquid crystal layer 3A is opposite to the turning direction of the second cholesteric liquid crystal 312 of the second liquid crystal layer 3B, and the helical pitch P11 of the first cholesteric liquid crystal 311 is different from the helical pitch P12 of the second cholesteric liquid crystal 312.

In Modified Example 1, too, the same advantages as those of each of the above-described embodiments are achieved.

Modified Example 2

Figure 13:
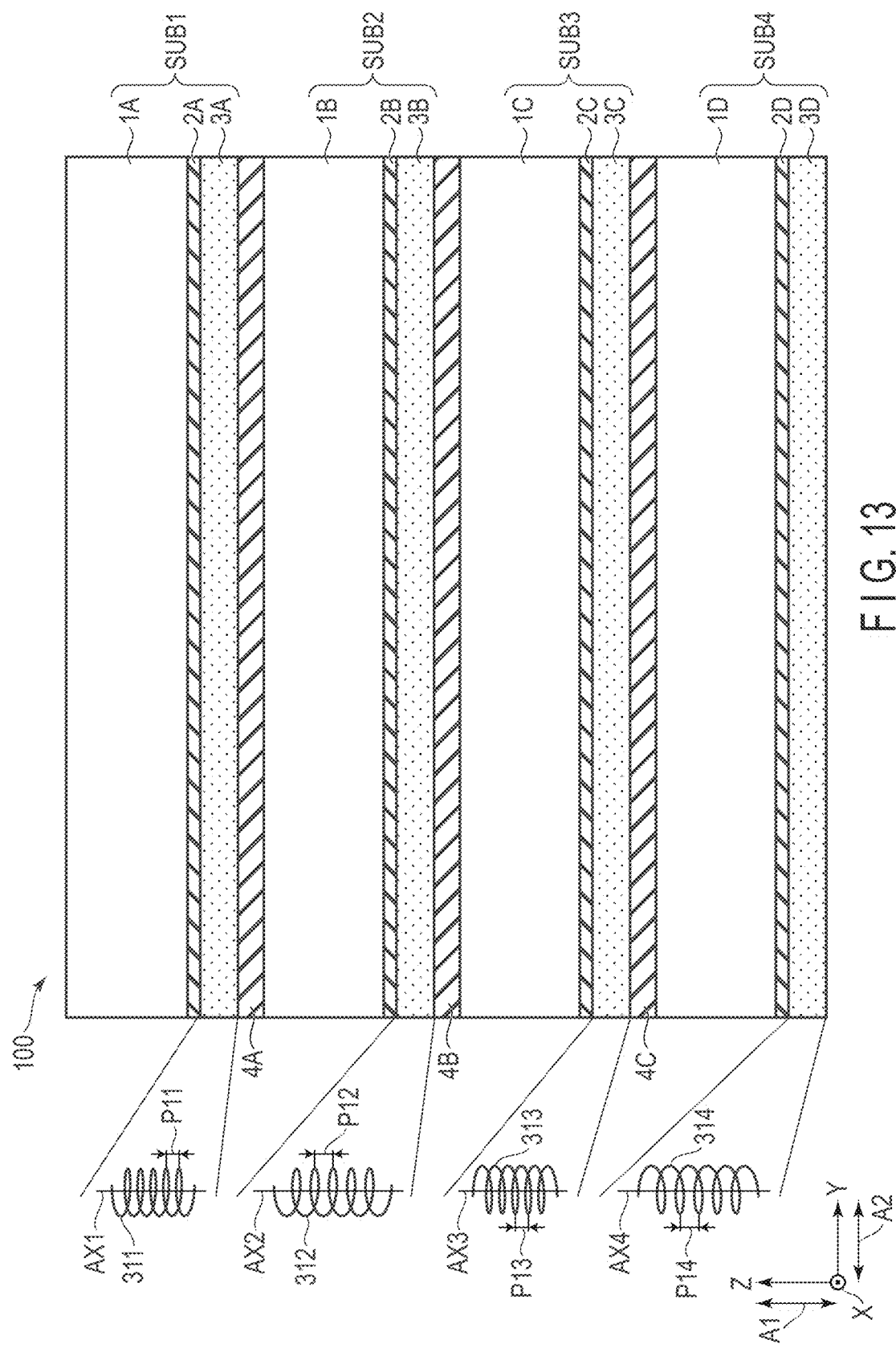
FIG. 13 is a cross-sectional view schematically illustrating Modified Example 2 of the liquid crystal optical elements 100.

FIG. 13 is a cross-sectional view schematically illustrating Modified Example 2 of the liquid crystal optical elements 100.

The liquid crystal optical element 100 comprises the first substrate SUB1, the second substrate SUB2, a third substrate SUB3, a fourth substrate SUB4, an adhesive layer 4A, an adhesive layer 4B, and an adhesive layer 4C.

The first substrate SUB1 comprises the first transparent substrate 1A, the first alignment film 2A, and the first liquid crystal layer 3A.

The second substrate SUB2 comprises the second transparent substrate 1B, the second alignment film 2B, and the second liquid crystal layer 3B. The adhesive layer 4A adheres the first liquid crystal layer 3A and the second transparent substrate 1B to each other.

The third substrate SUB3 comprises a third transparent substrate 1C, a third alignment film 2C, and a third liquid crystal layer 3C. The adhesive layer 4B adheres the second liquid crystal layer 3B and the third transparent substrate 1C to each other.

The fourth substrate SUB4 comprises a fourth transparent substrate 1D, a fourth alignment film 2D, and a fourth liquid crystal layer 3D. The adhesive layer 4C adheres the third liquid crystal layer 3C and the fourth transparent substrate 1D to each other.

For example, the turning direction of the first cholesteric liquid crystal 311 of the first liquid crystal layer 3A is opposite to the turning direction of a third cholesteric liquid crystal 313 of the third liquid crystal layer 3C, and the helical pitch P11 of the first cholesteric liquid crystal 311 is equal to a helical pitch P13 of the third cholesteric liquid crystal 313.

The turning direction of the second cholesteric liquid crystal 312 of the second liquid crystal layer 3B is opposite to the turning direction of a fourth cholesteric liquid crystal 314 of the fourth liquid crystal layer 3D, and the helical pitch P12 of the second cholesteric liquid crystal 312 is equal to a helical pitch P14 of the fourth cholesteric liquid crystal 314.

In addition, the helical pitch P11 of the first cholesteric liquid crystal 311 is different from the helical pitch P12 of the second cholesteric liquid crystal 312.

In Modified Example 2, too, the same advantages as those of each of the above-described embodiments are achieved.

As described above, according to the present embodiments, a liquid crystal optical element which can suppress the decrease in the efficiency of light utilization can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:
a first substrate comprising a first transparent substrate comprising a first outer surface and a first inner surface opposed to the first outer surface, a first alignment film disposed on the first inner surface, and a first liquid crystal layer which overlaps the first alignment film, which comprises first cholesteric liquid crystals, and which reflects part of light incident through the first transparent substrate toward the first transparent substrate;
a second substrate comprising a second transparent substrate comprising a second outer surface and a second inner surface opposed to the second outer surface, a second alignment film disposed on the second inner surface, and a second liquid crystal layer which overlaps the second alignment film, which comprises second cholesteric liquid crystals, and which reflects part of light transmitted through the first liquid crystal layer toward the first transparent substrate; and
a transparent adhesive layer which adheres the first substrate and the second substrate to each other, wherein
the transparent adhesive layer is in contact with the first liquid crystal layer and the second liquid crystal layer, and adheres the first liquid crystal layer and the second liquid crystal layer to each other.

2. The liquid crystal optical element of claim 1, wherein the first cholesteric liquid crystals and the second cholesteric liquid crystals have an equal helical pitch in a first direction and turn in opposite directions.

3. The liquid crystal optical element of claim 1, wherein the first cholesteric liquid crystals and the second cholesteric liquid crystals have different helical pitches in a first direction.

4. The liquid crystal optical element of claim 1, wherein
in cross-sectional view, the first transparent substrate comprises a first side surface and a second side surface opposed to the first side surface,
the first liquid crystal layer comprises a first reflective surface which crosses a normal of the first transparent substrate at an acute angle on the first side surface side, and
the second liquid crystal layer comprises a second reflective surface which crosses the normal of the first transparent substrate at an acute angle on the first side surface side.

5. The liquid crystal optical element of claim 1, wherein
the first cholesteric liquid crystals comprise first liquid crystal molecules, respectively, on one end side close to the first alignment film,
respective alignment directions of the first liquid crystal molecules arranged in a second direction along an interface between the first liquid crystal layer and the first alignment film change clockwise by equal angles,
the second cholesteric liquid crystals comprise second liquid crystal molecules, respectively, on one end side close to the second alignment film, and
respective alignment directions of the second liquid crystal molecules arranged in the second direction along an interface between the second liquid crystal layer and the second alignment film change counterclockwise by equal angles.

6. The liquid crystal optical element of claim 1, wherein
in cross-sectional view, the first transparent substrate comprises a first side surface and a second side surface opposed to the first side surface,
the first liquid crystal layer comprises a first reflective surface which crosses a normal of the first transparent substrate at an acute angle on the first side surface side, and
the second liquid crystal layer comprises a second reflective surface which crosses the normal of the first transparent substrate at an acute angle on the second side surface side.

7. The liquid crystal optical element of claim 1, wherein
the first cholesteric liquid crystals comprise first liquid crystal molecules, respectively, on one end side close to the first alignment film,
respective alignment directions of the first liquid crystal molecules arranged in a second direction along an interface between the first liquid crystal layer and the first alignment film change clockwise by equal angles,
the second cholesteric liquid crystals comprise second liquid crystal molecules, respectively, on one end side close to the second alignment film, and
respective alignment directions of the second liquid crystal molecules arranged in the second direction along an interface between the second liquid crystal layer and the second alignment film change clockwise by equal angles.

8. The liquid crystal optical element of claim 1, wherein the first outer surface and the second outer surface contact air.

9. The liquid crystal optical element of claim 1, wherein the transparent adhesive layer is a photo-curing acrylic resin.

10. The liquid crystal optical element of claim 1, wherein the adhesive layer adheres the first liquid crystal layer and the second transparent substrate to each other.

11. The liquid crystal optical element of claim 1, wherein
the first cholesteric liquid crystals and the second cholesteric liquid crystals have different helical pitches in a first direction, and
a turning direction of the first cholesteric liquid crystals is identical to a turning direction of the second cholesteric liquid crystals.

12. The liquid crystal optical element of claim 1, wherein
the first cholesteric liquid crystals and the second cholesteric liquid crystals have different helical pitches in a first direction, and
a turning direction of the first cholesteric liquid crystals is opposite to a turning direction of the second cholesteric liquid crystals.

13. The liquid crystal optical element of claim 1, wherein
the first liquid crystal layer and the second liquid crystal layer cure in a state in which alignment directions of liquid crystal molecules are fixed.

14. The liquid crystal optical element of claim 1, wherein
no electrode is provided between the first transparent substrate and the first liquid crystal layer, and between the second transparent substrate and the second liquid crystal layer.

* * * * *